(No Model.)
H. C. SPALDING.
ELECTRIC CIRCUIT.
No. 346,509. Patented Aug. 3, 1886.
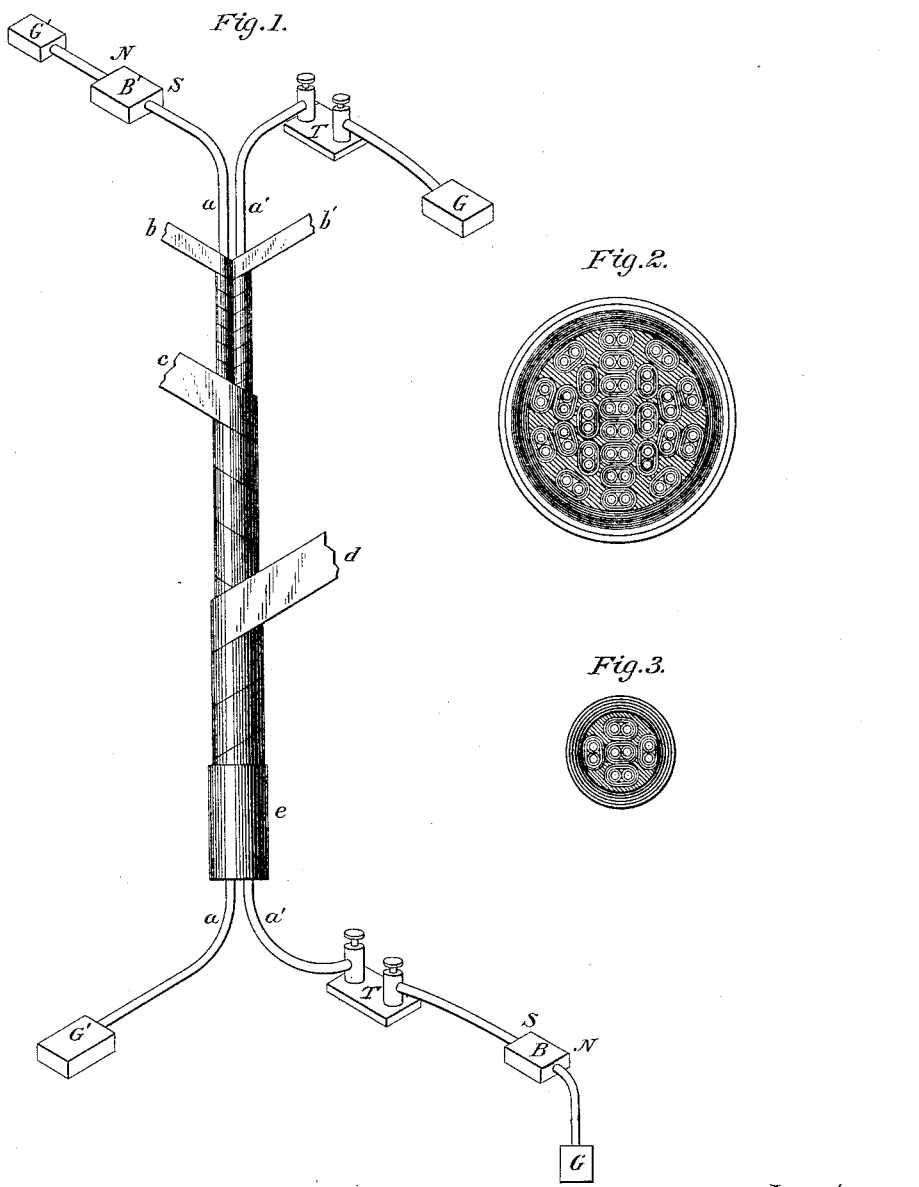
Attest:
Raymond F. Barnes
W. Frisby
Inventor:
Henry C. Spalding
By Parker W. Page
atty.

UNITED STATES PATENT OFFICE.

HENRY C. SPALDING, OF BOSTON, MASSACHUSETTS.

ELECTRIC CIRCUIT.

SPECIFICATION forming part of Letters Patent No. 346,509, dated August 3, 1886.

Application filed April 21, 1884. Serial No. 128,805. (No model.)

*To all whom it may concern:*

Be it known that I, HENRY C. SPALDING, a citizen of the United States, and a resident of Boston, in the county of Suffolk and State of Massachusetts, have invented certain new and useful Improvements in Electric Circuits, of which the following is a specification, reference being had to the drawings accompanying and forming a part of the same.

My present invention relates to electric cables and to methods of using or working the same; and the objects of the invention are mainly as follows: First, to avoid the use of round wire or complete metallic circuits for rapid signaling on long underground or submarine lines, thereby reducing the resistance of said circuits; second, to protect these lines from induction and retardation due to currents in neighboring conductors, static effects, and the earth's electricity; third, to facilitate the working of long cables by increasing their capacity for rapid signaling; and, fourth, to obtain stronger and more distinct signals. To attain these results I employ in combination with a line-wire an insulated idle wire. Through the latter I pass a continuous current from any suitable generator, the circuit being completed by grounding the idle wire at both ends. The line-wire is also grounded at both ends and connected with suitable transmitting and receiving instruments and with a generator in such manner that the current flowing through it will be in an opposite direction to that in the idle wire. These two wires I bind together in a cable, inclosing both in an insulated metallic sheath or screen. I may use one only of such insulated and protected lines in a cable, or I may run a number of them in the same conduit or cable. This I have illustrated in the accompanying drawings, where—

Figure 1 illustrates the system as applied to a simple or single-circuit cable. Figs. 2 and 3 represent in cross-section cables or conduits containing a number of such circuits.

The letters $a'$ $a$ designate, respectively, the active and idle wires of a cable.

T T are the transmitting and receiving instruments connected with the active wire.

B is the generator for the active line, and G G the earth connections of the same.

G' G' designate the earth connections of the idle-wire $a$; B', the generator connected therewith in such manner as to send into the line a current in the opposite direction to that flowing in the wire $a'$. Each wire is insulated by a spiral wrapping of paper, $b$ $b'$. They are then laid together and wound with a strip, $c$, of paper. Over this is wound a strip, $d$, of metal foil, and over this is applied an insulating-coating, $e$. When more than one of these cables are bound together or grouped in a conduit or cable, as shown in Figs. 2 and 3, each is operated or used in the same manner as above described. It is obvious in such a case, however, that one generator may be used for a number of idle circuits.

It is well known that an ordinary underground or submarine cable possesses when used the characteristics of a condenser. For example, a positive current flowing in the conducting-wire produces a state of electrical tension, the sheathing of the cable being negatively electrified. This reacts upon the conductor, which becomes positively electrified by induction. By this means the flow of current is greatly retarded and rapid working interfered with. By my system, however, the idle wire serves to maintain this state of tension both in the sheathing and also in the other or active wire. When signals are sent through the latter, therefore, they are accelerated, rather than retarded if the current be in an opposite direction to that in the idle wire. For this purpose it is only necessary to use such a battery as will overcome the difference of earth potential, as it would even be possible to transmit signals without any battery, depending entirely upon the inductive charge from the idle wire. The battery-power that would be required for a round-wire circuit is by this means lessened, while the retardation incident to ordinary cables is prevented. The insulated metal sheath which I use shuts off the deleterious effects of the earth's electricity.

I do not confine myself to any special method of insulating the conductors, nor of constructing the cable, as these are matters forming the subject of other applications of mine now on file.

What I claim is—

1. In a system for the transmission of electric signals, the combination, with the conductor of the working-circuit and a generator, and signaling devices connected therewith, of an idle conductor associated with the working-conductor, and a generator for producing a continuous current through the same in an opposite direction to that in the working-circuit, as and for the purpose specified.

2. In a system for the transmission of electric signals, the combination, with a cable containing two insulated wires or conductors grounded at their ends and inclosed in an insulated metal sheath, of a generator for producing a continuous current connected with one of said conductors, signaling instruments, and a generator connected with the other conductor, the generators being connected to send currents, so that the currents passing therein shall be in opposite directions, as and for the purpose specified.

3. In a system for the transmission of electrical signals, the combination, with a cable or conduit, two or more pairs of insulated conductors, and sheathings of insulating material, and metal surrounding the same, of means for passing a continuous current through one of each pair of conductors and means for signaling through the others by intermittent currents of opposite direction to the continuous currents, as and for the purpose set forth.

In testimony whereof I have hereunto set my hand this 12th day of April, 1884.

HENRY C. SPALDING.

Witnesses:
WARREN P. DUDLEY,
SANFORD H. DUDLEY.